United States Patent Office 3,210,387
Patented Oct. 5, 1965

3,210,387
6-DEHYDROPROGESTERONES AND THEIR PREPARATION
Romano Deghenghi, St. Laurent, Quebec, Canada, assignor to American Home Products Corporation, New York, N.Y., a corporation of Delaware
No Drawing. Filed May 6, 1963, Ser. No. 278,479
Claims priority, application Canada, Nov. 28, 1962, 863,339
10 Claims. (Cl. 260—397.3)

This invention is concerned with certain new chemical compounds and their preparation. More particularly, my invention is directed to certain new steroids, new 6-dehydroprogesterones, and to their preparation from available starting materials.

My invention thus involves new and inventive methods of preparation, as well as new progestationally-active steroid compounds resulting from this synthesis. It is also concerned with certain new intermediates secured during the process by which new, biologically-active, steroids are prepared.

My new biologically-active compounds include the 17α-alkylated or 6,17α-dialkylated-4,6-pregnadienes which have the following structure:

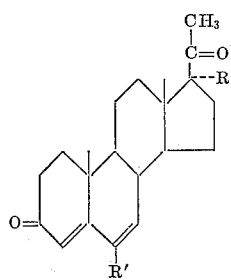

In this formula R represents hydrogen or a straight-chain lower alkyl group of from 1–4 carbon atoms, and R' represents hydrogen or lower alkyl.

Among these new compounds is the new compound 6-methyl-17α-ethyl-6-dehydroprogesterone which is at least twice as active, by the oral route, as the known 6,17α-dimethyl-6-dehydroprogesterone.

As starting materials for preparing the new compounds it is preferred to use pregnenolone, or the correspondingly alkylated pregnenolones, as, for example, 17α-methylpregnenolone, 17α-ethylpregnenolone, 17α-n-propylpregnenolone, 17α-n-butylpregnenolone, 6,17α-dimethylpregnenolone, 6-methyl-17α-ethylpregnenolone, 6-methyl-17α-n-propylpregnenolone, or 6-methyl-17α-n-butylpregnenolone. The preparation of these pregnenolones is described in my copending application Ser. No. 266,204, filed March 19, 1963. By the method of this invention, herein described, these pregnenolones are smoothly converted to the corresponding pregnadienes of the Formula I with high yields.

This conversion is essentially an Oppenauer oxidation, conveniently modified in order to achieve high yields and purer products than are obtainable by known methods.

This reaction results in oxidizing and simultaneously dehydrogenating in positions 6, 7. More specifically, the reaction oxidizes the secondary hydroxyl to a ketone and shifts the double bond from position 5–6 to the conjugated position 4–5 and removes 2 atoms of hydrogen from positions 6–7 and introduces a double bond between these positions.

The Oppenauer oxidation reaction is carried out in an inert solvent in the presence of a hydrogen acceptor, a catalyst and a dehydrogenating agent. Preferably, the reaction is carried out in the oxidation mixture of cyclohexanone and aluminum isopropoxide in toluene, used with the addition of a small quantity of chloranil. As a result there are formed dienones of the formula shown below in which R and R' have the meaning defined above.

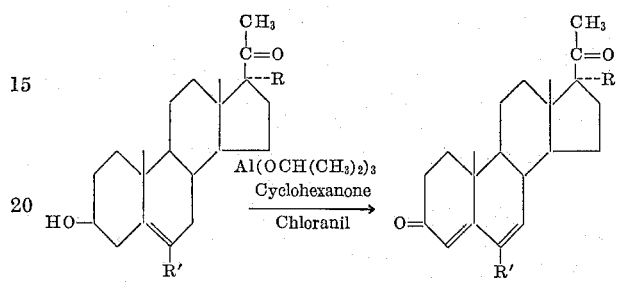

Several methods for the introduction of a double bond in position 6–7, with or without concomitant transformation of a Δ⁵-3β-hydroxy group to a Δ⁴-3-keto group, are known. Thus Djerassi in "Organic Reactions," vol. VI, p. 207 ff., has reported a somewhat similar reaction using very large quantities of benzoquinone (about 6 parts per part of steroid) as hydrogen acceptor in the absence of cyclohexanone. This reaction has been reported to yield approximately 40 percent of the desired Δ⁴,⁶-3-ketone (ibid., p. 230), but the crude reaction mixtures are black tars, which is presumably due to the presence of thermal condensation products of benzoquinone. Purification of these mixtures is a laborious and difficult procedure (ibid., p. 236).

Agnello et al., J. Am. Chem. Soc., vol. 79, p. 1257 (1957), have described a method for the introduction of a double bond in position 6–7 into a Δ⁴-3-ketosteroid using chloranil as hydrogen acceptor. This method results in a yield of about 60 percent of the desired Δ⁴,⁶-3-ketosteroid, but it requires extended periods of time (approximately ten hours) for completion of the reaction. Finally, Dannenburg, Chem. Ber., vol. 94, p. 3094 (1961), has described the dehydrogenation of certain Δ⁵-3-hydroxysteroids by means of chloranil but in that reaction only fully aromatized phenanthrene derivatives were obtained.

The procedure herein described is characterized by using only small amounts of chloranil (one half to one part of chloranil per part of steroid) instead of the very large amounts of benzoquinone (about six parts per part of steroid) used by Djerassi. This has the distinct advantage that the crude reaction product is a yellow oil which is easily purified. Simple crystallization often yields the desired Δ⁴,⁶-3-ketosteroid in pure form. The yields obtained are considerably higher than those reported by Djerassi, being in the range of 70–75 percent of theory.

Agnello uses a Δ⁴-3-ketone as starting material, while there is used in my process a Δ⁵-3β-hydroxysteroid. In this way the herein-described procedure avoids the essential step used in the Agnello et al. process, which involves transforming a Δ⁵-3β-hydroxysteroid into a Δ⁴-3-ketosteroid. My novel method requires only a relatively very short reaction period (from one-half to two hours, preferably one hour), whereas Agnello et al. required a reaction period of about ten hours.

My new method includes the step of refluxing a pregnenolone of Formula II in which R and R' have the significance defined above,

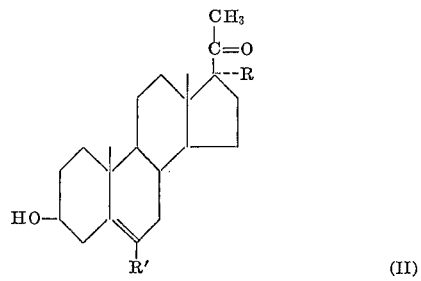

in solution in toluene with cyclohexanone, aluminum isopropoxide and chloranil. This reaction can be performed in about an hour. After cooling, extraction of the reaction mixture with ether, washing with dilute sodium hydroxide solution and water, followed by evaporation of the solvent and steam distillation of the organic residue, yields the corresponding 4,6-pregnadiene.

The following examples illustrate my invention in various preferred aspects thereof.

*Example 1.—6-dehydroprogesterone and 17α-lower alkyl derivatives thereof*

A quantity of 1.0 g. of pregnenolone (pregn-5-en-3β-ol-20-one) was heated at the reflux temperature in the presence of 30 ml. of toluene, 10 mol. of cyclohexanone, 1.0 g. of aluminum-isopropoxide, and 0.5 g. of chloranil, for a period of one hour. Extraction with ether and washing with diluted sodium hydroxide solution and water, followed by steam distillation of the organic residue, gave 0.995 g. of a yellow oil, representing crude 6-dehydroprogesterone. The pure product is obtained by crystallization from ether; M.P. 145° C. λ max. 287 mμ, log ε 4.3.

Similarly, when starting with 17α-methylpregnenolone, 17α-methyl-6-dehydroprogesterone is obtained; when starting with 17α-ethylpregnenolone, 17α-ethyl-6-dehydroprogesterone is obtained; when starting with 17α-n-propylpregnenolone, 17α-n-propyl-6-dehydroprogesterone is obtained; and when starting with 17α-n-butylpregnenolone, 17α-n-butyl-6-dehydroprogesterone is secured.

*Example 2.—6,17α-dimethyl-6-dehydroprogesterone*

A quantity of 2.35 g. of 6,17-dimethylpregnenolone in 100 ml. of toluene was treated, as in the previous example, with 24 cc. of cyclohexanone, 2.4 g. of aluminum isopropoxide, and 2.4 g. of chloranil for one hour. The usual working up gave 2.1 g. of crude 6,17α-dimethyl-6-dehydroprogesterone, which can be conveniently purified by crystallization or chromatography; M.P. 145° C., λ max. 293 mμ, log ε 4.2.

*Example 3.—6-methyl-17α-lower alkyl-6-dehydroprogesterones*

A quantity of 2.0 g. of 6-methyl-17-ethylpregnenolone was treated, as in the previous example, to give 1.9 g. of crude 6-methyl-17α-ethyl-6-dehydroprogesterone. This was purified by chromatography and crystallization to a M.P. 184–186° C.; [α]$_D$+52° (1% CHCl$_3$), λ max. 294 mμ, log ε 4.3.

Similarly, when starting with 6-methyl-17α-n-propylpregnenolone, 6-methyl-17α-n-propyl-6-dehydroprogesterone is obtained; and when starting with 17α-n-butyl-6-methylpregnenolone, 17α-n-butyl-6-methyl-6-dehydroprogesterone is obtained.

I claim:
1. 17α-n-propyl-6-dehydroprogesterone.
2. 17α-n-butyl-6-dehydroprogesterone.
3. In a process for preparing a compound of the formula

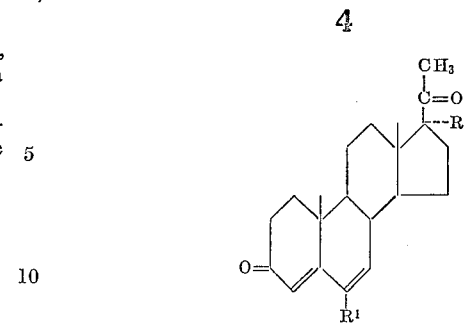

where R and R' are each selected from the group consisting of hydrogen and lower alkyl, wherein a starting material of the formula

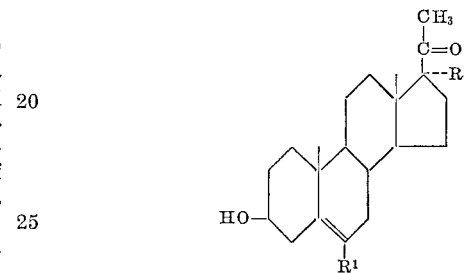

R and R' having the above-defined significance, is subjected to a modified Oppenauer oxidation wherein oxidation and simultaneous dehydrogenation in positions 6,7 occur, the improvement which consists in subjecting said starting material in an inert solvent therefor to the action of chloranil and cyclohexanone in the presence of aluminum isopropoxide at a temperature within the range 100° C. to 200° C.

4. The process defined in claim 3 wherein said inert solvent is an aromatic hydrocarbon.

5. In a process for preparing a compound selected from the group consisting of 17α-alkylated-4,6-pregnadienes and 6,17α-dialkylated-4,6-pregnadienes from a starting material selected from the group consisting of 17α-methyl-pregnenolone, 17α-ethyl-pregnenolone, 17α-n-propylpregnenolone, 17α-n-butylpregnenolone, 6,17α-dimethylpregnenolone, 6-methyl-17α-ethylpregnenolone, 6-methyl-17α-n-propylpregnenolone and 6-methyl-17α-n-butylpregnenolone wherein said starting material is subjected to a modified Oppenauer oxidation wherein oxidation and simultaneous dehydrogenation in positions 6,7 occur, the improvement which consists in subjecting said starting material in an inert solvent therefor to the action of chloranil and cyclohexanone in the presence of aluminum isopropoxide at a temperature within the range 100° C. to 200° C.

6. In a process for preparing 6-methyl-17α-ethyl-6-dehydroprogesterone from 6-methyl-17α-ethylpregnenolone by subjecting said last-named compound to a modified Oppenauer oxidation wherein oxidation and simultaneous dehydrogenation in positions 6,7 occur, the improvement which consists in subjecting said 6-methyl-17α-ethylpregnenolone in an inert solvent to the action of chloranil and cyclohexanone in the presence of aluminum isopropoxide at a temperature within the range 100° C. to 200° C.

7. In a process for preparing 17α-n-propyl-6-dihydroprogesterone from 17α-n-propylpregnenolone by subjecting said last-named compound in a modified Oppenauer oxidation wherein oxidation and simultaneous dehydrogenation in positions 6,7 occur, the improvement which consists in subjecting said 17α-n-propylpregnenolone in an inert solvent to the action of chloranil and cyclohexanone in the presence of aluminum isopropoxide at a temperature within the range 100° C. to 200° C.

8. In a process for preparing 17α-n-butyl-6-dehydroprogesterone from 17α-n-butylpregnenolone by subjecting said last-named compound to a modified Oppenauer oxidation wherein oxidation and simultaneous dehydrogenation in positions 6,7 occur, the improvement which consists in subjecting said 17α-n-butylpregnenolone in an inert solvent to the action of chloranil and cyclohexanone in the presence of aluminum isopropoxide at a temperature within the range of 100° C. to 200° C.

9. In a process for preparing 6-methyl-17α-n-propyl-6-dehydroprogesterone from 6-methyl-17α-n-propylpregnenolone by subjecting said last-named compound to a modified Oppenauer oxidation wherein oxidation and simultaneous dehydrogenation in positions 6,7 occur, the improvement which consists in subjecting said 6-methyl-17α-n-propylpregnenolone in an inert solvent to the action of chloranil and cyclohexanone in the presence of aluminum isopropoxide at a temperature within the range 100° C.–200° C.

10. In a process for preparing 6-methyl-17α-n-butyl-6-dehydroprogesterone from 6-methyl-17α-n-butylpregnenolone by subjecting said last-named compound to a modified Oppenauer oxidation wherein oxidation and simultaneous dehydrogenation in positions 6,7 occur, the improvement which consists in subjecting said 6-methyl-17α-n-butylpregnenolone in an inert solvent to the action of chloranil and cyclohexanone in the presence of aluminum isopropoxide at a temperature within the range 100° C. to 200° C.

References Cited by the Examiner
UNITED STATES PATENTS 3,133,913   5/64   Deghenghi _____ 260—239.55

OTHER REFERENCES

Deghenghi et al., "Journal of American Chem. Soc.," vol. 83 (1961), page 4668 relied on.

Weiss et al., "Chemistry and Industry," January 19, 1963, pages 118–119 relied on.

LEWIS GOTTS, *Primary Examiner.*